US006986983B2

(12) United States Patent
Wei et al.

(10) Patent No.: US 6,986,983 B2
(45) Date of Patent: Jan. 17, 2006

(54) METHOD FOR FORMING A REFLECTION-TYPE LIGHT DIFFUSER

(75) Inventors: Chung-Kuang Wei, Kao-Hsiung Hsien (TW); Cheng-Jen Chu, I-Lan (TW); Chia-Liang Lin, Hua-Lien (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 237 days.

(21) Appl. No.: 10/248,809

(22) Filed: Feb. 21, 2003

(65) Prior Publication Data

US 2003/0161940 A1 Aug. 28, 2003

(30) Foreign Application Priority Data

Feb. 27, 2002 (TW) ............................... 91103698 A

(51) Int. Cl.
*G03F 7/00* (2006.01)
*G03F 7/40* (2006.01)

(52) U.S. Cl. ........................ 430/321; 430/26; 430/320; 430/322; 430/324; 430/330

(58) Field of Classification Search .................. 430/20, 430/320, 321, 322, 324, 330
See application file for complete search history.

(56) References Cited

U.S. PATENT DOCUMENTS

| | | | | |
|---|---|---|---|---|
| 5,499,128 | A * | 3/1996 | Hasegawa et al. | 349/155 |
| 5,886,119 | A * | 3/1999 | Schaedeli et al. | 526/266 |
| 5,936,668 | A * | 8/1999 | Sawanobori et al. | 349/113 |
| 6,096,634 | A * | 8/2000 | Nguyen | 438/624 |
| 6,291,146 | B1 * | 9/2001 | Chang et al. | 430/394 |

* cited by examiner

*Primary Examiner*—Nicole Barreca
(74) *Attorney, Agent, or Firm*—Winston Hsu

(57) ABSTRACT

A reflection-type light diffuser is fabricated on a glass substrate, which has a pixel matrix array disposed thereon. The pixel matrix array includes a plurality of adjacent pixel regions, and each of the pixel regions has a pair of side edges that are parallel and opposite. A photoresist pattern is formed on the glass substrate, and the photoresist pattern includes a plurality of wave-shaped straight protrusions formed on the side edges of each of the pixel regions and a plurality of bump structures formed on each of the pixel regions. A reflective metal layer is formed on the photoresist pattern.

7 Claims, 21 Drawing Sheets

METHOD FOR FORMING A REFLECTION-TYPE LIGHT DIFFUSER

BACKGROUND OF INVENTION

1. Field of the Invention

The present invention relates to a method for forming a reflection-type light diffuser, and more particularly, to a method for forming a reflection-type light diffuser applied to a reflective liquid crystal display (LCD).

2. Description of the Prior Art

Generally, there are two basic types of LCDs according to image display modes: a light transmissive type and a light reflective type. The light transmissive LCD comprises a backlight disposed on a rear side of a liquid crystal cell for emitting light. The light radiated from the backlight selectively passes through the liquid crystal cell, thereby realizing desired images. The light reflective LCD comprises a front light source and a reflective plate disposed on a rear side of the LCD so as to reflect incident light generated from the front light source toward the front side of the LCD, thereby realizing desired images. The users can choose the light transmissive LCD or the light reflective LCD of their own accord.

Because the prior art reflective plate of the light reflective LCD reflects the incident light towards a fixed point of view, the LCD has a narrow field of vision that restricts users to viewing displayed images on the LCD to angles around a specific angular magnitude (i.e. a visible angle). Therefore, for the purpose of increasing the visible angle of the light reflective LCD, a plurality of bump structures are formed on the reflective plate to rough the surface of the reflective plate and increase scattering angles of the reflected lights and thus broaden the viewable angle of the light reflective LCD.

Please refer to FIG. 1A to FIG. 1D of schematic diagrams illustrating a prior art method for forming a reflection-type light diffuser 28 on a glass substrate 10. As shown in FIG. 1A, a spin-coating process is performed to form a resin material layer 12 on the glass substrate 10, and the resin material layer 12 is pre-baked for about 30 minutes at about 300° C. The glass substrate 10 has a thickness of about 1.1 centimeters (cm), and the resin material layer 12 has a thickness of about 1.5 micrometers ($\mu$m). Then as shown in FIG. 1B, an exposing process is performed by using a photo mask 14 and a light source 20. The photo mask 14 has a plurality of light-shielding regions 16 and a plurality of light-transmitting regions 18, so that a photoresist pattern 22 is formed in the resin material layer 12 after a subsequent developing process, as shown in FIG. 1C. As shown in FIG. 1D, a soft baking process is performed to soften the photoresist pattern 22 to form a continuous photoresist pattern 24. A metal layer 26 is formed on the glass substrate 10 and the reflection-type light diffuser 28 is completed. The metal layer 26 comprises aluminum (Al), nickel (Ni), chromium (Cr), or silver (Ag) metal, and the metal layer 26 has a thickness of between 0.01 to 1.0 $\mu$m. The photoresist pattern 24 comprises a plurality of bump structures 24.

Because the reflection-type light diffuser 28 has a plurality of bump structures 24, the surface of the reflection-type light diffuser 28 is rough and uneven. When incident light 30 enters the reflection-type light diffuser 28, the incident light 30 generates a plurality of scattering lights 32 by reflecting from the metal layer 26 and the bump structures 24. However, the bump structures 24 are disposed on the reflection-type light diffuser 28 randomly, so that the scattering directions of the scattering lights are too wide and thus result in weakening the scattering light 32 intensity. In addition, the scattering lights 32 also interfere with each other. Therefore, another reflection-type light diffuser is disclosed to solve the above-mentioned problems.

Please refer to FIG. 2A to FIG. 2F of schematic diagrams illustrating a prior art method for forming a reflection-type light diffuser 52 on a glass substrate 40. As shown in FIG. 2A, a resin material layer 42 is spin-coated on the glass substrate 40, and the glass substrate 40 is pre-baked. As shown in FIG. 2B, an exposing and developing process is performed by using a photo mask 44 to form a photoresist pattern 46 in the resin material layer 42. The photoresist pattern 46 comprises a plurality of straight protrusions, as shown in FIG. 2C. Then as shown in FIG. 2D, the glass substrate 40 is turned over 90 degrees and thus tilted toward a perpendicular direction. A thermal treatment process is performed to soften the photoresist pattern 46. Since the photoresist pattern 46 is made of heated plastic material, the photoresist pattern 46 can be heated and softened to form a photoresist pattern 48 using gravity. The photoresist pattern 48 includes asymmetrical silt structures as shown in FIG. 2E. Finally, as shown in FIG. 2F, the glass substrate 40 is put back to its original horizontal position and then cooled down. A metal layer 50 is formed on the glass substrate 40 and the reflection-type light diffuser 52 is completed.

When incident light 54 enters the reflection-type light diffuser 52, the incident light 54 generates a plurality of scattering lights 56 by reflecting from the metal layer 50 and the straight protrusions 48. However, the reflection-type light diffuser 52 with the straight protrusions 48 still has a problem of the light directionality. Therefore, the U.S. Pat. No. 6,163,405 discloses a reflection-type light diffuser to solve the problems of light scattering and light direction. Please refer to FIG. 3 of a schematic diagram illustrating a prior art reflection-type light diffuser 68. As shown in FIG. 3, a photoresist pattern 62 and a metal layer (not shown in FIG. 3) are formed on a glass substrate 60, and the photoresist pattern 62 comprises a plurality of parallel slant structures 64 and a plurality of knob structures 66 disposed on the slant structures 64. A multi-exposure shift process is utilized to form the slant structures 64 by using a photo mask (not shown in the FIG. 3). The photo mask is moved at a fixed distance many times and the exposure processes with different exposure powers are performed to form the slant structures 64 in the multi-exposure shift process. And then another photo mask (not shown in the FIG. 3) is utilized to form the knob structures 66 on the slant structures 64. Although the reflection-type light diffuser 68 with the knob on slant structures improves the above-mentioned problems, the structures are fabricated by using the exposure processes many times and the two different photo masks to form the knob on slant structures, resulting in complicating the process and increasing costs.

SUMMARY OF INVENTION

It is therefore a primary objective of the claimed invention to provide a method for fabricating a reflection-type light diffuser to solve the problems of light scattering and the light directionality of the prior art light diffuser.

It is another objective of the claimed invention to provide a simplified method for fabricating a reflection-type light diffuser.

According to the claimed invention, the reflection-type light diffuser is formed on a glass substrate, the glass substrate comprises a pixel matrix array disposed on the substrate, the pixel matrix array comprises a plurality of adjacent pixel regions, and each of the pixel regions has a pair of side edges which are parallel and opposite. A photoresist layer is formed on the substrate, and an exposing and developing process is performed by using a photo mask to form a photoresist pattern in the photoresist layer. The photoresist pattern comprises a plurality of wave-shaped straight protrusions positioned on the side edges of each of the pixel regions and a plurality of bump structures positioned on each of the pixel regions. A reflective metal layer is formed on the photoresist pattern.

It is an advantage that the claimed invention uses the exposing and developing process for only one time to form the wave-shaped straight protrusions and the bump structures simultaneously so as to simplify the process and reduce costs. In addition, the reflection-type light diffuser with the wave-shaped straight protrusions and the bump structures improves the problems of light scattering and the light directionality.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1A:
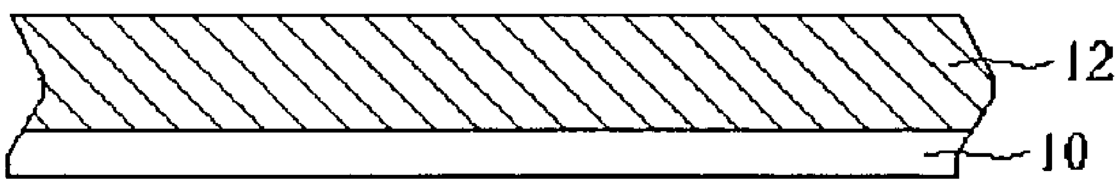
FIG. 1A to FIG. 1D are schematic diagrams of a prior art method for forming a reflection-type light diffuser.
Figure 1B:
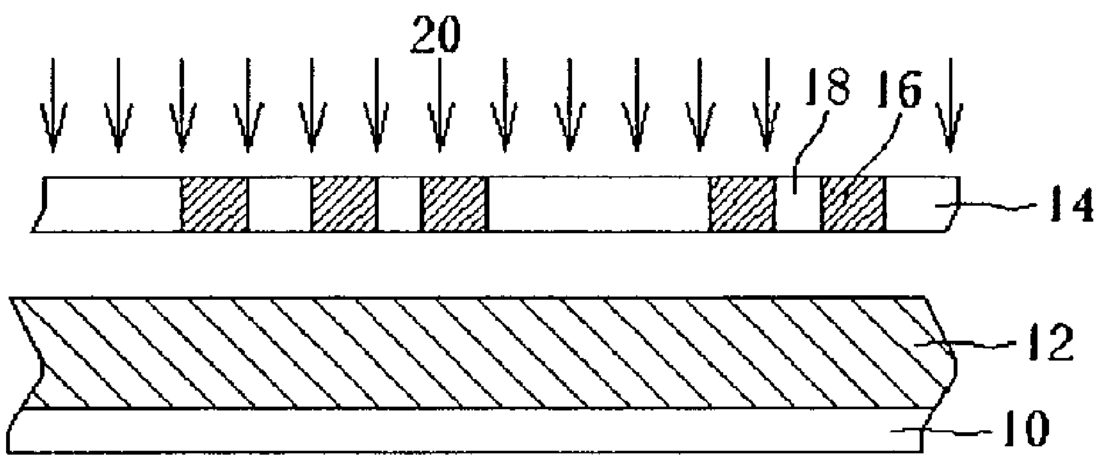
Figure 1C:
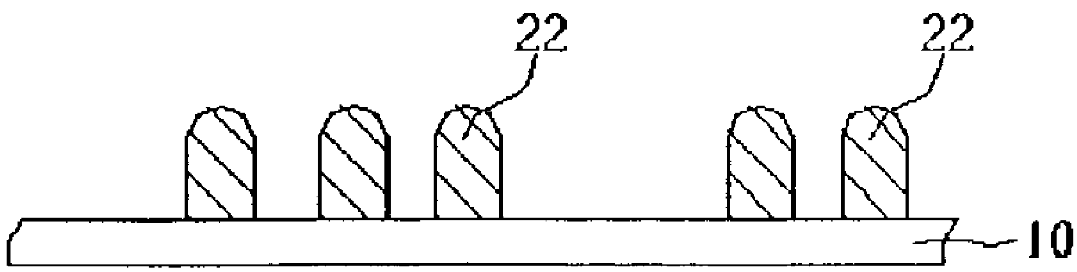
Figure 1D:
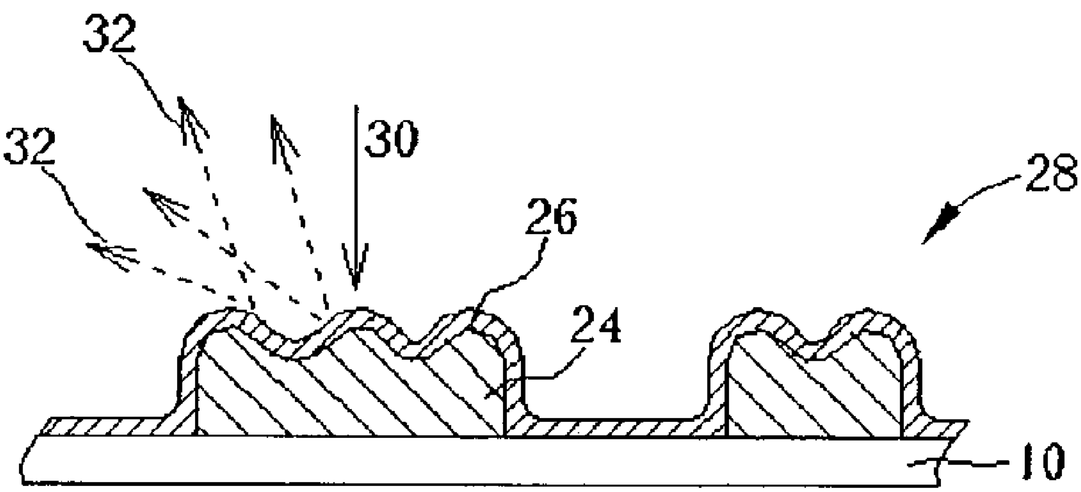
Figure 2A:
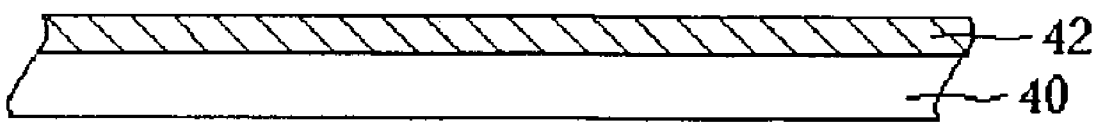
FIG. 2A to FIG. 2F are schematic diagrams of a prior art method for forming a reflection-type light diffuser.
Figure 2B:
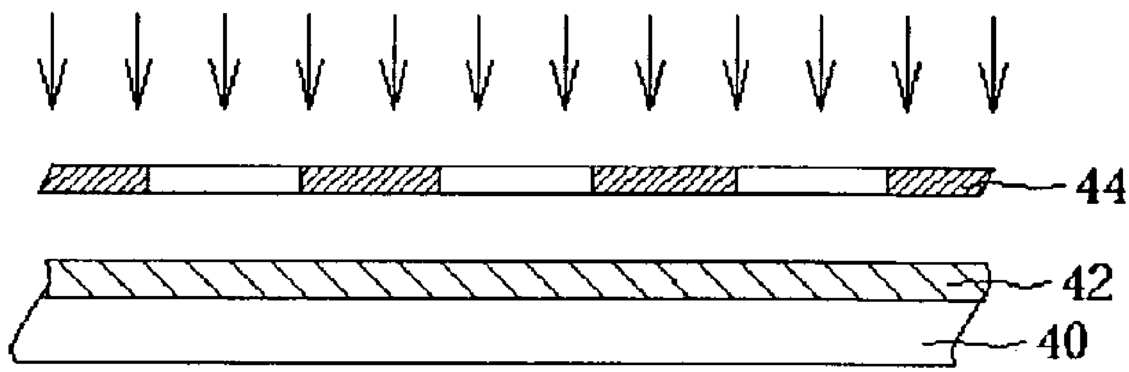
Figure 2C:
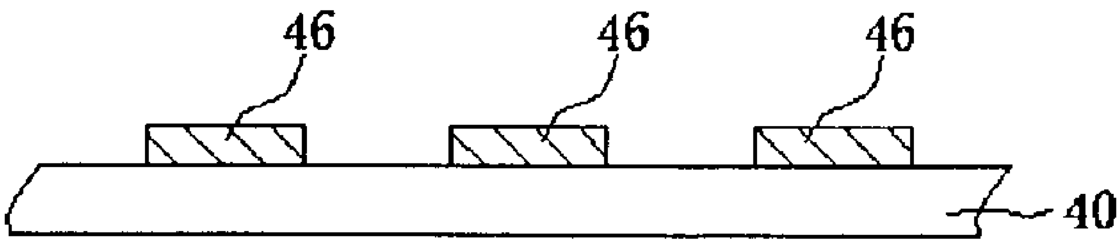
Figure 2D:
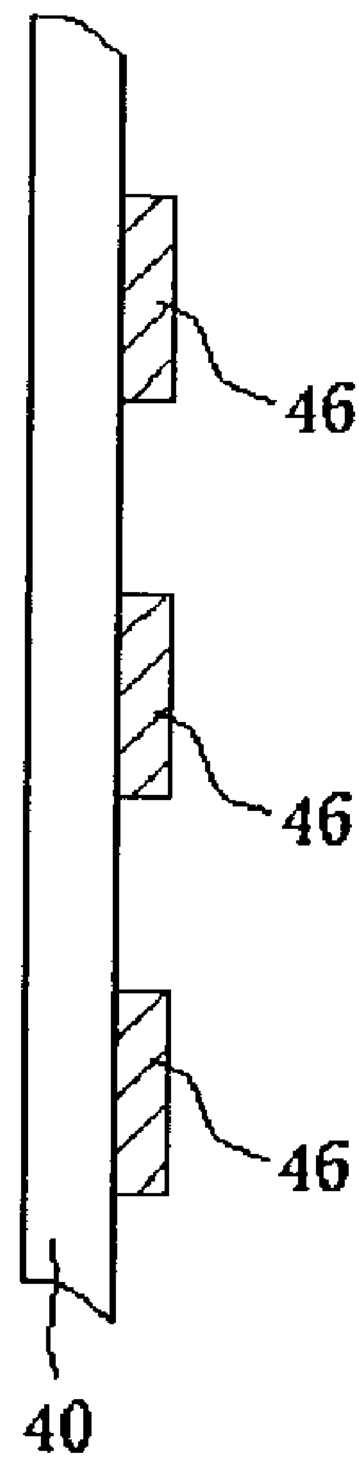
Figure 2E:
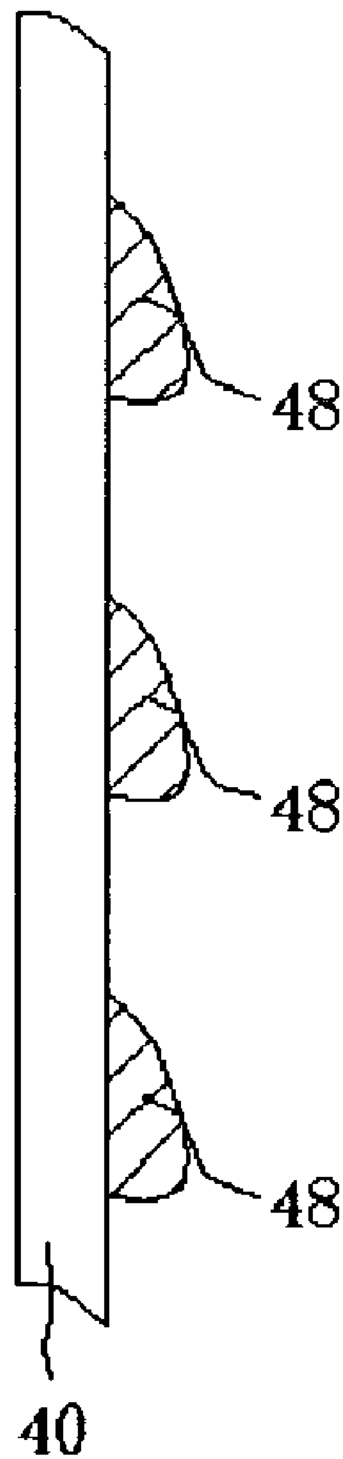
Figure 2F:
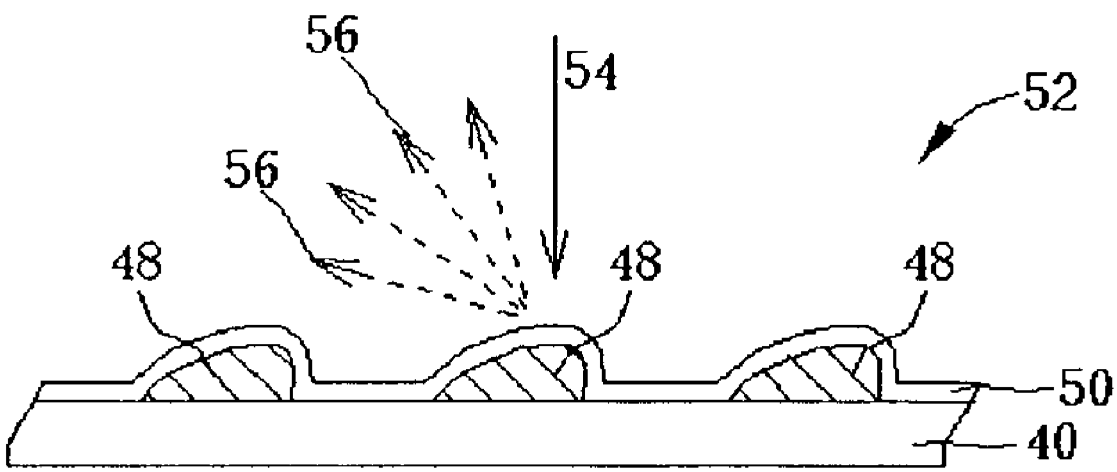
Figure 3:
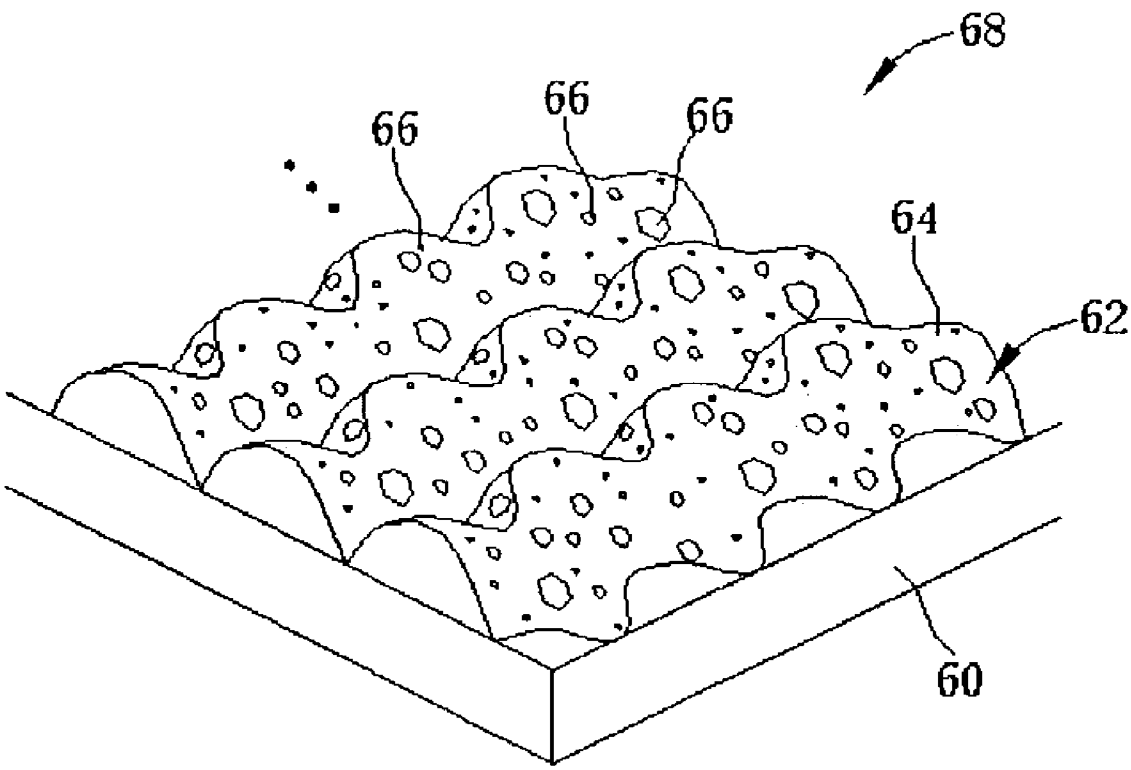
FIG. 3 is a schematic diagram of a prior art reflection-type light diffuser.
Figure 4:
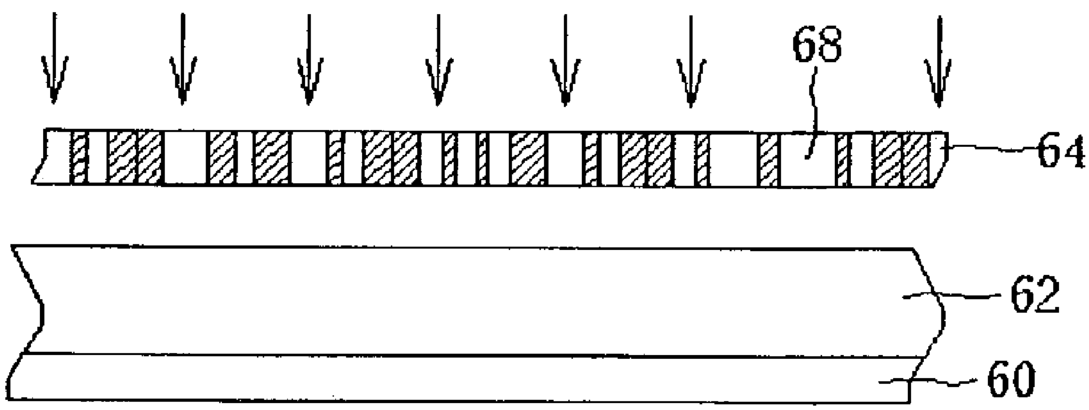
FIG. 4 to FIG. 6 are schematic diagrams of a reflection-type light diffuser and related method according to the first embodiment of the present invention.
Figure 4A:
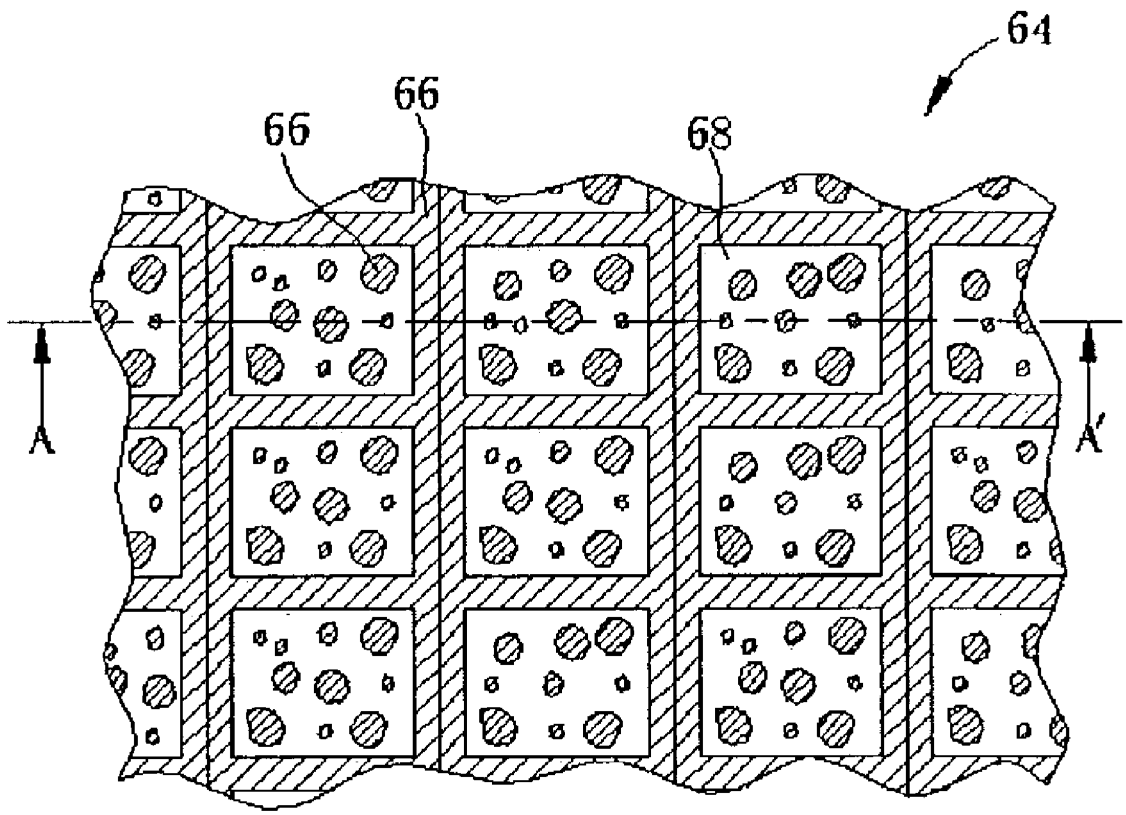
FIG. 4A and FIG. 4B are top views of photo masks utilized in the first embodiment of the present invention.
Figure 4B:
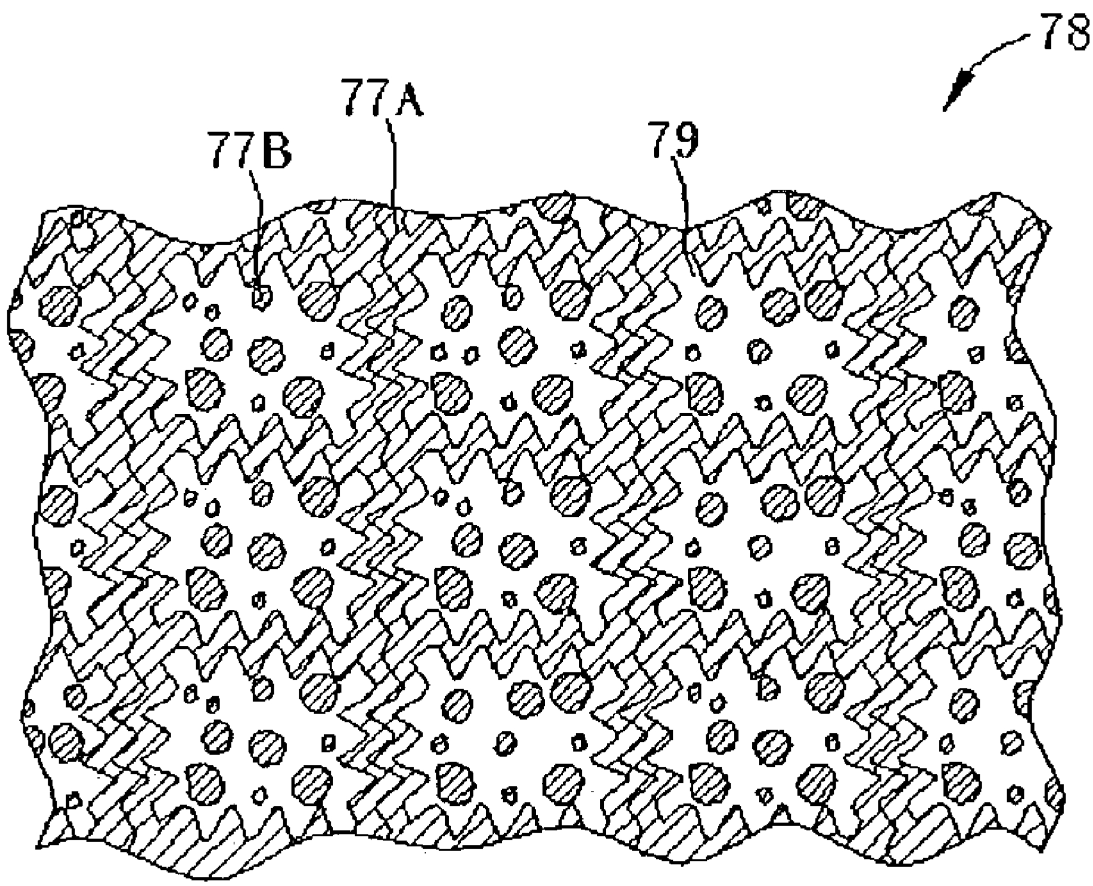
Figure 5:
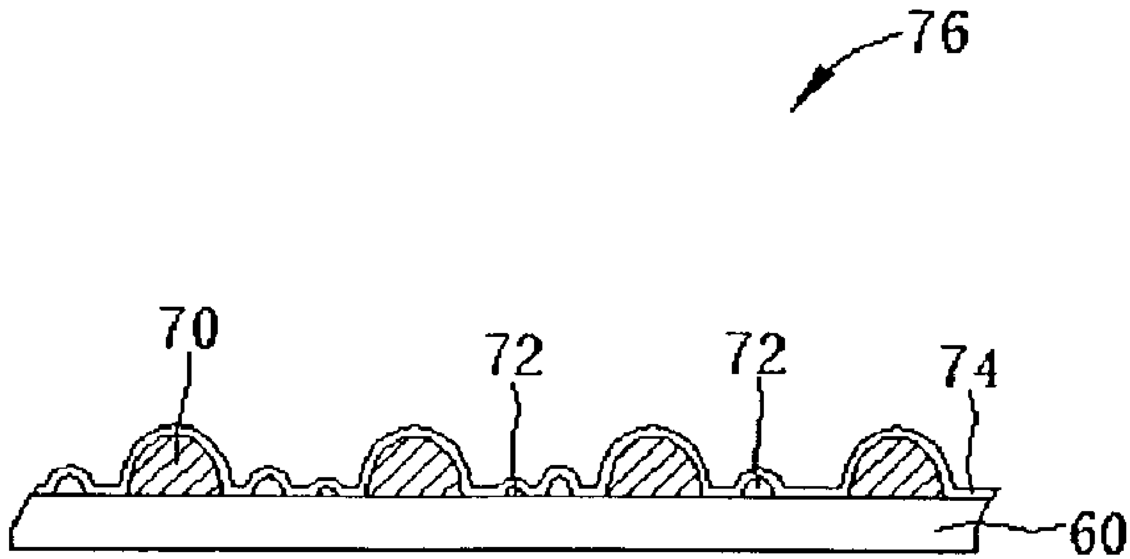
Figure 6:
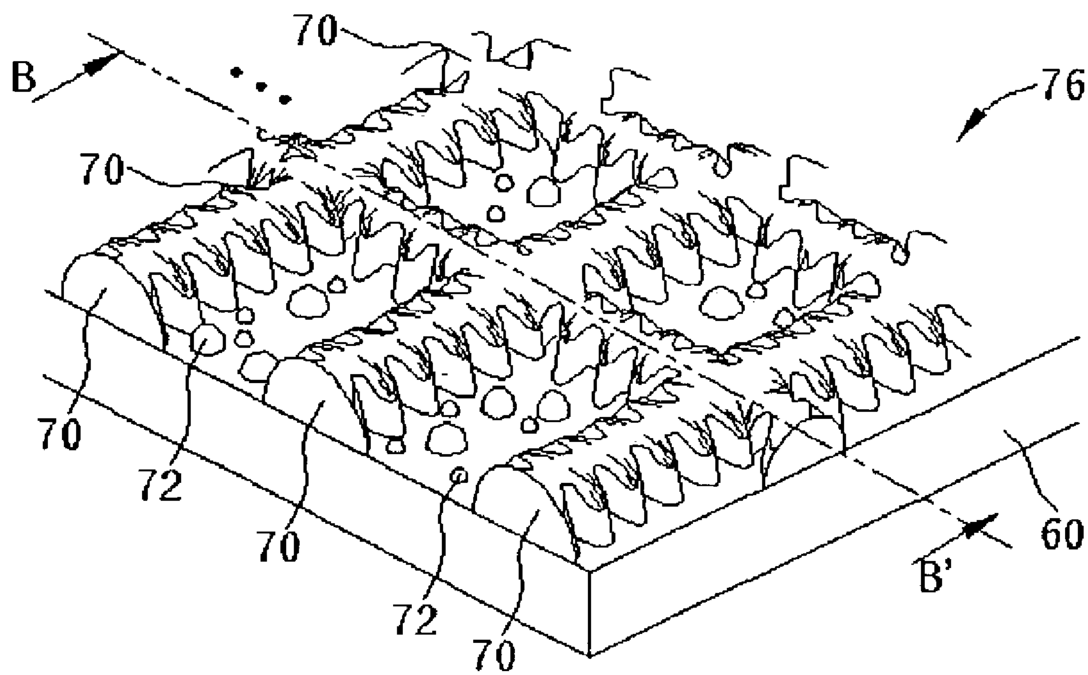

Please refer to FIG. 4 to FIG. 6 of schematic diagrams illustrating a reflection-type light diffuser 76 formed on a glass substrate 60 and related method according to the first embodiment of the present invention. FIG. 4A and FIG. 4B are top views illustrating photo masks 64, 78 utilized in the first embodiment of the present invention. FIG. 5 is a cross-sectional view illustrating the reflection-type light diffuser 78 along a tangent line BB shown in FIG. 6. FIG. 6 is a schematic diagram illustrating the reflection-type light diffuser according to the first embodiment of the present invention. As shown in FIG. 4, a positive photoresist layer 62 is spin-coated on the glass substrate 60, and the photoresist layer 62 is pre-baked for about 30 minutes at approximately 80 to 90° C. The photoresist layer 62 has a thickness of between 4.8 to 5.5 $\mu$m. Then, a photo mask 64 (along the tangent line AA' as shown in FIG. 4A) is utilized to perform an exposing process, and a photoresist pattern (not shown in FIG. 4) is formed in the photoresist layer 62. The photo mask 64 includes a plurality of light shielding regions 66 and a plurality of light transmitting regions 68 according to demands of the reflection-type light diffuser process.

As shown in FIG. 5, a developing process is performed to remove the photoresist layer 62 not exposed by the light shielding regions 66 of the photo mask 64. Further, a baking process with a temperature of approximately 130° C. and a follow-up baking process with a temperature of approximately 220° C. are performed in sequence. The photoresist pattern includes a plurality of parallel straight protrusions 70 and a plurality of bump structures 72 positioned between adjacent straight protrusions 70. The straight protrusions 70 has a pair of opposite side edges, and the side edges are straight lines. After that, a reflective metal layer 74 is formed on the photoresist pattern, and the reflection-type light diffuser 76 is completed. However, the present invention is not limited in this. A photo mask 78 shown in FIG. 4B can be used in the exposing and developing pocess to form another photoresist pattern. The photoresist pattern also includes a plurality of straight protrusions 70 and a plurality of bump structures, but the side edges of the straight protrusions 70 are wave-shaped as shown in FIG. 6. The photo mask 78 includes a plurality of light shielding regions 77A, 77B and a plurality of light transmitting regions 79. The light shielding regions 77A of the photo mask 78 correspond to the wave-shaped parallel straight protrusions 70 of the photoresist pattern and the light shielding regions 77B corresponds to the bump structures 72 of the photoresist pattern.

Figure 7:
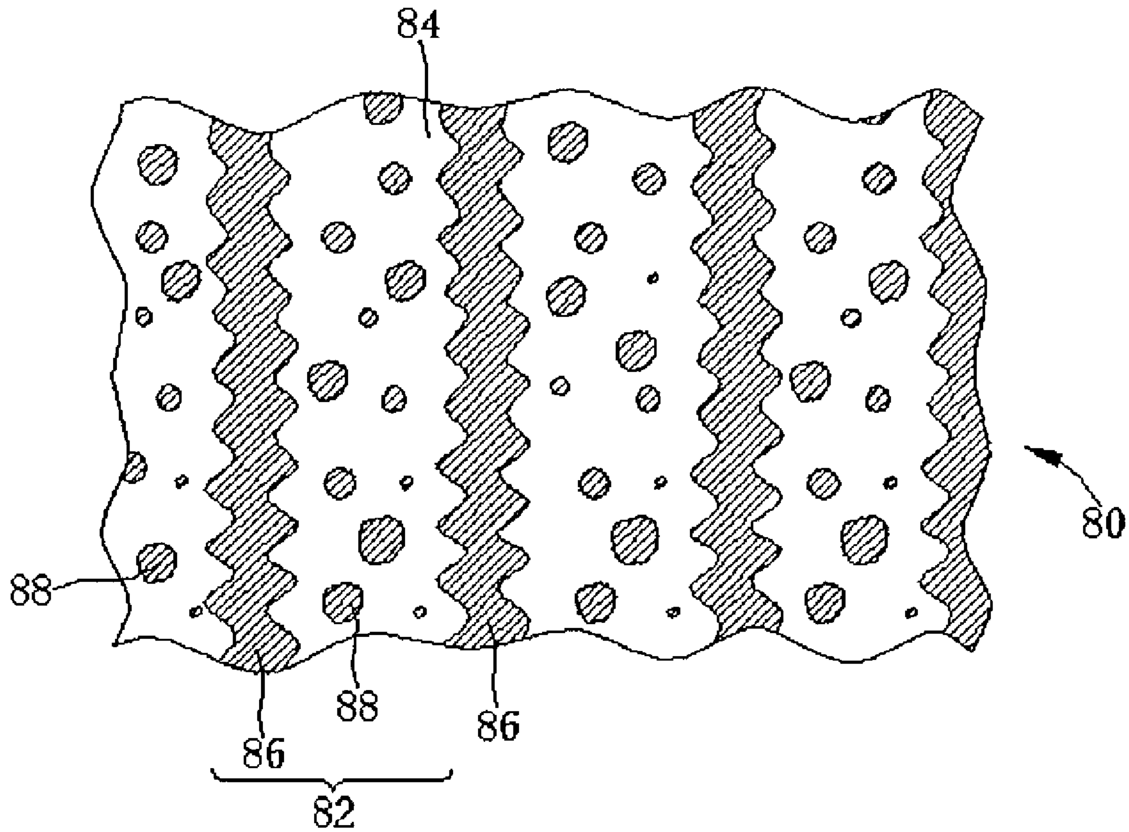
FIG. 7 is a top view of a photo mask utilized in the second embodiment of the present invention.
Figure 8:
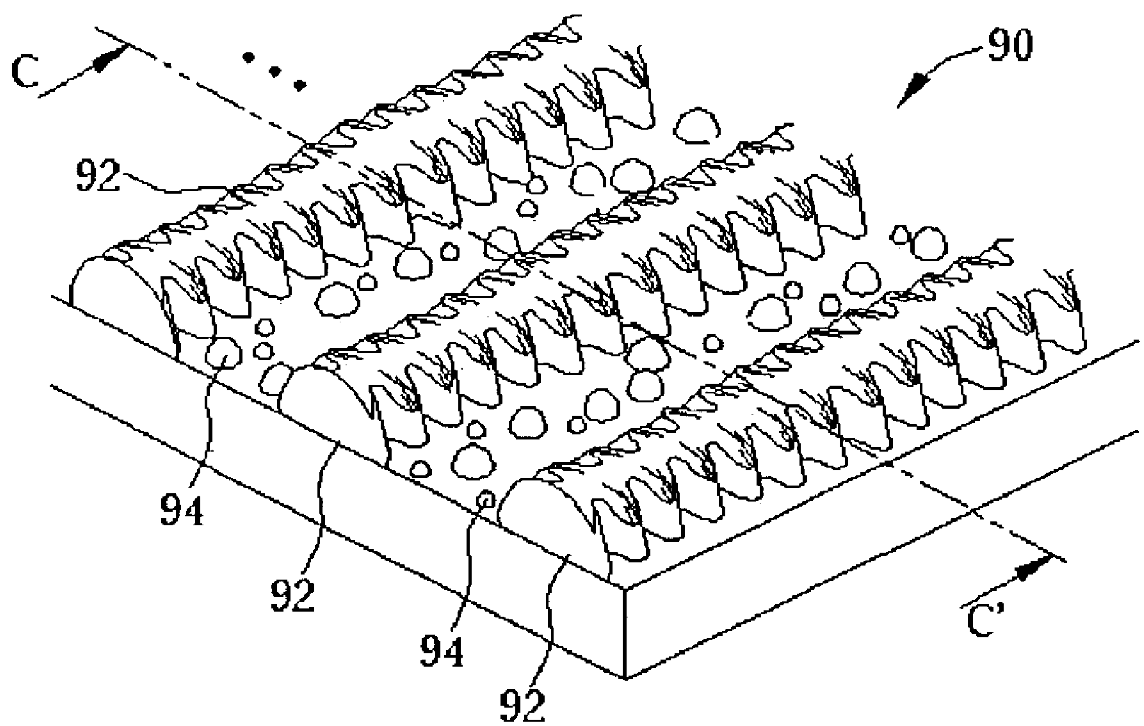
FIG. 8 is a schematic diagram of a reflection-type light diffuser according to the second embodiment of the present invention.
Figure 9:
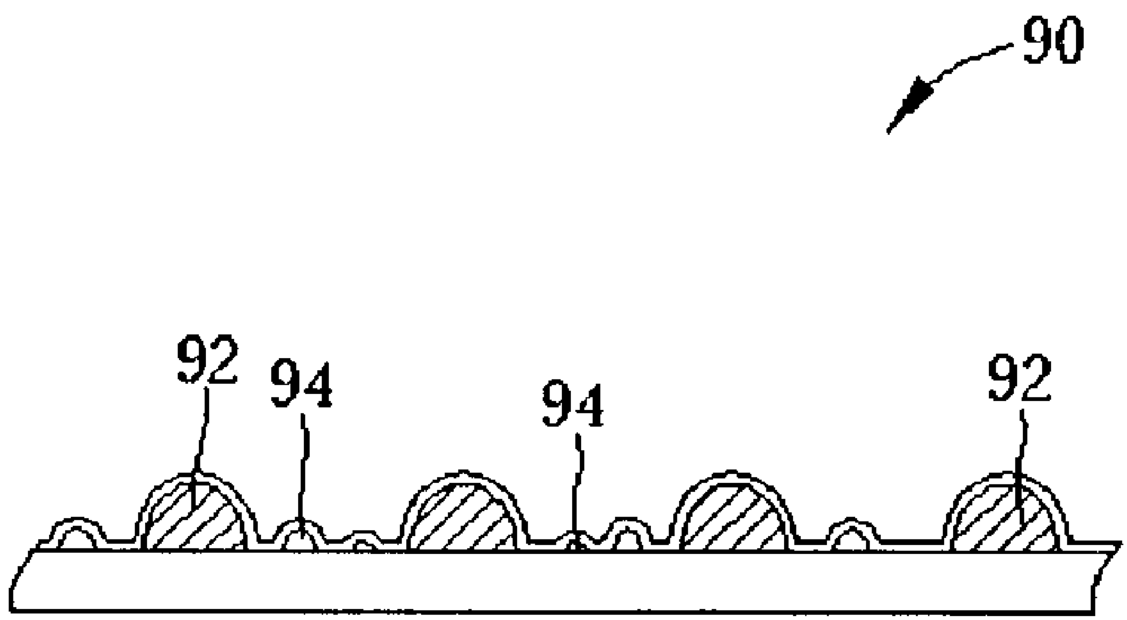
FIG. 9 is a cross-sectional view of the reflection-type light diffuser shown in FIG. 8.

Please refer to FIG. 7 to FIG. 9. FIG. 7 is a top view illustrating a photo mask 80 according to the second embodiment of the present invention. FIG. 8 is a schematic diagram illustrating a reflection-type light diffuser 90 according to the second embodiment of the present invention. FIG. 9 is a cross-sectional view illustrating the reflection-type light diffuser 90 along a tangent line CC' shown in FIG. 8. As shown in FIG. 7, the photo mask 80 includes a plurality of light shielding regions 82 and a plurality of light transmitting regions 84, and the light shielding regions 82 include a plurality of first light shielding regions 86 and a plurality of,second light shielding regions 88. Utilizing the photo mask 80 as the photo mask 64 shown in FIG. 4 to perform an exposing and developing process, then a photoresist pattern including a plurality of parallel wave-shaped straight protrusions 92 and a plurality of bump structures 94 disposed between adjacent straight protrusions 92 is formed on the glass substrate as shown in FIG. 8. The first light shielding regions 86 correspond to the parallel wave-shaped straight protrusions 92 of the photoresist pattern and the second light shielding regions 88 correspond to the bump structures 94 of the photoresist pattern.

Figure 10:
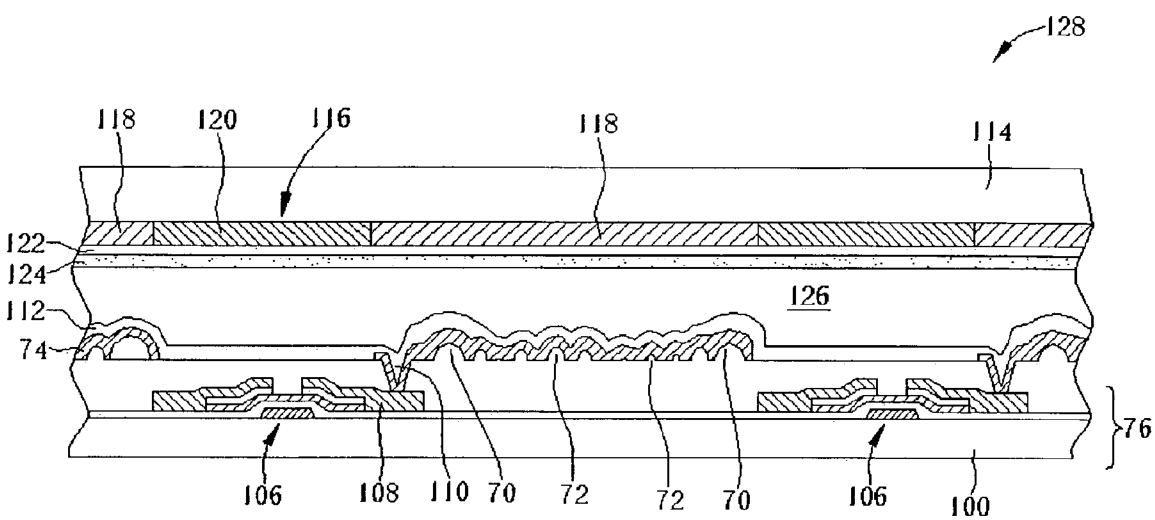
FIG. 10 is a cross-sectional view of the reflection-type light diffuser of the first embodiment of the present invention applied to a reflective LCD.
Figure 11:
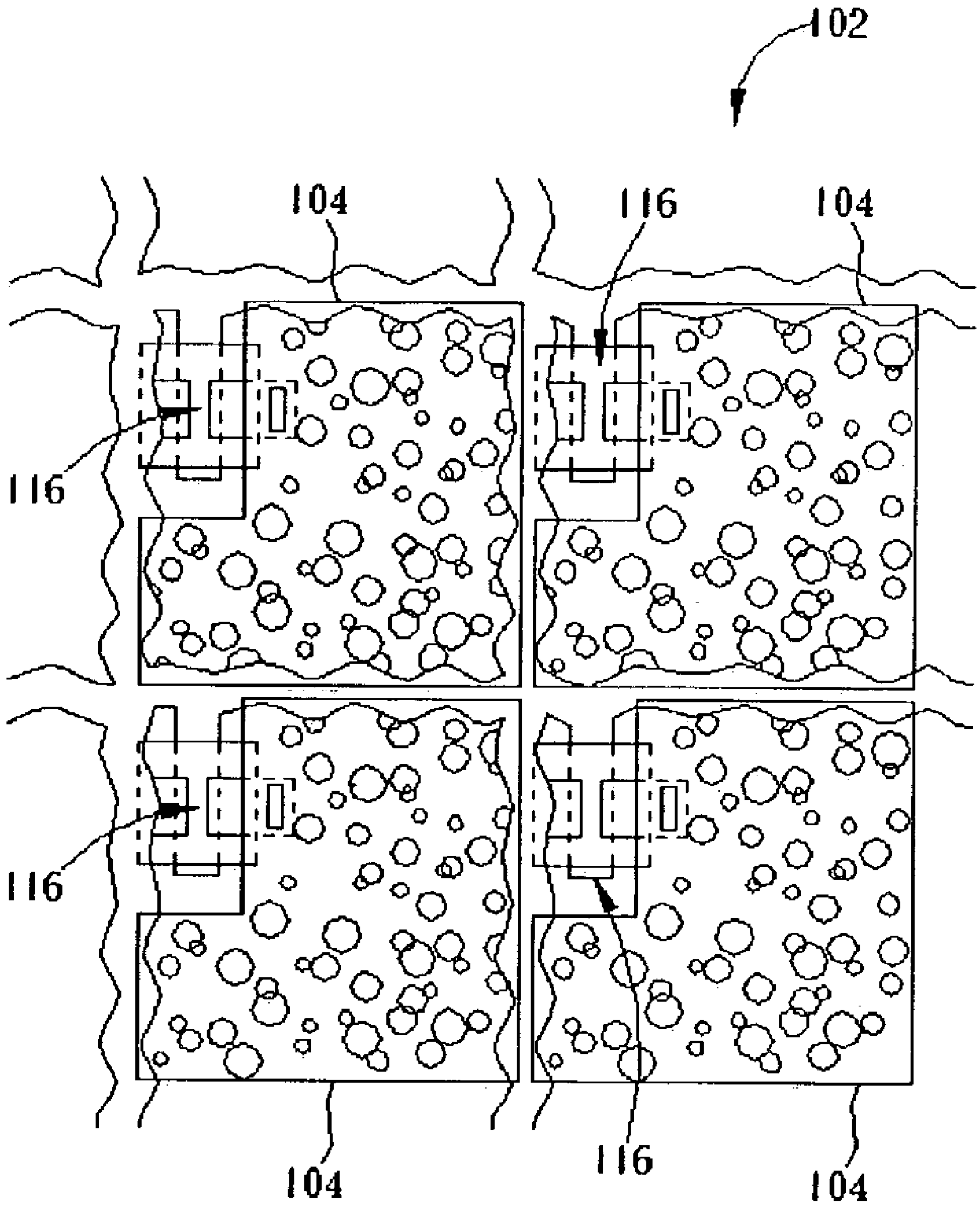
FIG. 11 is a top view of the reflection-type light diffuser of the first embodiment of the present invention applied to the reflective LCD.

In addition, the reflection-type light diffuser of the present invention can be applied to a reflective liquid crystal display (LCD). Please refer to FIG. 10 and FIG. 11. FIG. 10 is a cross-sectional view illustrating the reflection-type light diffuser 76 applied to a reflective LCD 128. FIG. 11 is a top view illustrating the reflection-type light diffuser 76 applied to the reflective LCD 128. As shown in FIG. 10, the reflective LCD 128 is formed on a glass substrate 100. The glass substrate 100 includes a pixel matrix array 102 disposed on the glass substrate 100. The pixel matrix array 102 includes a plurality of adjacent pixel regions 104, and each of the pixel regions 104 has a pair of side edges which are parallel and opposite as shown in FIG. 11. First, a thin film transistor (TFT) structure 106 is formed at a corner of each of the pixel regions 104 on the glass substrate 100. The TFT structure 106 includes a gate conductive layer, an insulating layer, a semiconductor layer, a source electrode and a drain electrode. Then, the reflection-type light diffuser 76 or the reflection-type light diffuser 90 is formed on the glass substrate 100. In the preferred embodiment of the present invention, the reflection-type light diffuser 76 is utilized as an example. For the purpose of connecting the reflective metal layer 74 of the reflection-type light diffuser 76 and the drain electrode of the TFT 106, an opening is formed before depositing the reflective metal layer 74. Then, the reflective metal layer 74 is deposited on the glass substrate 100 and is filled with the opening to form a contact hole 110, and an orientation film 112 is formed on the glass substrate 100.

Further, a filter array 116 is formed on another glass substrate 114. The filter array 116 includes a R/G/B CFA 118 and a black filter array 120. Further, a transparent electrode, such as ITO 122, and an orientation film 124, are formed on the glass substrate 114, respectively. After that, the glass substrate 100 and the glass substrate 114 are positioned face to face so that the R/G/B CFA 116 corresponds to the reflective metal layer 74, and the black filter array 120 corresponds to the TFT 106. Then, a liquid crystal (LC) is injected between the glass substrate 100 and the glass substrate 114, and the reflective LCD 128 is completed.

When incident light (not shown in FIG. 10 and FIG. 11) enters the reflective LCD 128, the incident light passes through the glass substrate 14, the CFA 116, the transparent conductive layer 122, the orientation film 124, the LC 126, the orientation film 112, and then reaches the surface of the reflective metal layer 74 of the reflection-type light diffuser 76. Because the surface of the reflection-type light diffuser 76 has the plurality of wave-shaped straight protrusions 70 and the plurality of bumps structures 72, the incident light does not reflect toward a fixed direction, but scatters toward different directions.

In summary, the reflection-type light diffuser with the photoresist pattern includes the plurality of wave-shaped straight protrusions and the plurality of bumps structures on the glass substrate. Since the curvatures of the surface and the side edges of the wave-shaped straight protrusions and the bumps structures are varied, the incident light reflects and scatters toward various directions. Because the curvatures of the wave-shaped straight protrusions and the bumps structures are controlled by the exposing time, the exposing time relates to the thickness of the photoresist pattern. Therefore, the curvatures of photoresist pattern can be adjusted to a desired scattering direction according to the process demand. In addition, the present invention only uses the exposing and developing process once to form the wave-shaped straight protrusions and the bump structures simultaneously so as to simplify the process and reduce costs.

In contrast to the prior art technology, the present invention utilizes the exposing and developing process once to form the reflection-type light diffuser with the wave-shaped straight protrusions and the bump structures, which simplifies manufacturing processes and reduces costs. Since the wave-shaped straight protrusions and the bump structures positioned on the reflection-type light diffuser improve the problems of light directionality and the light scattering of the prior art reflective light diffuser, this results in no reduction of scattering light intensity and no color dissipation.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for fabricating a reflection-type light diffuser, the reflection-type light diffuser being used for scattering incident light, the method comprising:

providing a substrate comprising a pixel matrix array disposed on the substrate, the pixel matrix array comprising a plurality of pixel regions, each of the pixel regions having a pair of side edges which are parallel and opposite;

forming a photoresist layer on the substrate;

performing an exposing and developing process by using a photo mask to form a photoresist pattern in the photoresist layer, the photoresist pattern comprising a plurality of straight protrusions positioned on the side edges of each of the pixel regions and a plurality of bump structures positioned on each of the pixel regions;

performing a baking process and a follow-up baking process on the photoresist pattern; and forming a reflective metal layer on the photoresist pattern.

2. The method as claim 1 wherein the method further comprises a pre-baking process performed before the exposing and developing process, and the pre-baking process has a temperature of approximately 80 to 90° C.

3. The method as claim 1 wherein the baking process performed after the exposing and developing process, and the baking process has a temperature of approximately 130° C.

4. The method as claim 3 wherein the follow-up baking process performed after the baking process, and the follow-up baking process has a temperature of approximately 220° C.

5. The method as claim 1 wherein the photoresist layer has a thickness between 4.8 to 5.5 micrometers ($\mu$m).

6. The method as claim 1 wherein a pattern of the photo mask comprises a plurality of first light shielding regions corresponding to the straight protrusions of the photoresist pattern and a plurality of second light shielding regions corresponding to the bump structures of the photoresist pattern.

7. The method as claim 1 wherein the straight protrusions of the photoresist pattern has a pair of opposite side edges, and the side edges are wave-shaped.

* * * * *